(12) United States Patent
Chi

(10) Patent No.: US 6,648,116 B2
(45) Date of Patent: Nov. 18, 2003

(54) POWER TRANSMISSION APPARATUS WITH A COILED TORSIONAL SPRING CAPABLE OF BEING WOUND AROUND ROLLERS ON A SLEEVE ASSEMBLY FOR TRANSMITTING A TORQUE

(75) Inventor: Chin-Huai Chi, Chang Hua (TW)

(73) Assignee: Chin Fong Machine Industrial Co., Ltd., Chang Hua (TW)

( * ) Notice: Subject to any disclaimer, the term of this patent is extended or adjusted under 35 U.S.C. 154(b) by 0 days.

(21) Appl. No.: 10/200,156

(22) Filed: Jul. 23, 2002

(65) Prior Publication Data

US 2003/0116394 A1 Jun. 26, 2003

(51) Int. Cl.⁷ .......................... F16D 13/08; F16D 41/20
(52) U.S. Cl. .................... 192/41 S; 192/81 C
(58) Field of Search .............. 192/41 S, 81 C

(56) References Cited

U.S. PATENT DOCUMENTS 3,598,210 A * 8/1971 Barr ........................ 192/38
6,422,366 B1 * 7/2002 Uehara ................... 192/48.92

* cited by examiner

Primary Examiner—Richard M. Lorence
(74) Attorney, Agent, or Firm—Baker Botts L.L.P.

(57) ABSTRACT

A power transmission apparatus includes a sleeve assembly disposed rotatably around a stationary support shaft and having an annular surface unit that is formed with a plurality of axially extending slots. A plurality of rollers are confined respectively and rollably within the slots. A coiled torsional spring is disposed around the sleeve assembly, is spaced apart from the rollers, and is fastened to the driving gear at one end and to the driven gear at the other end. During rotation of a primary driving gear that is sleeved fixedly on the sleeve assembly, when a secondary driving gear rotates on the sleeve assembly, the spring is wound around the sleeve assembly so as to clamp the rollers between the spring and the sleeve assembly, thereby transmitting a torque from the primary driving gear to a driven gear on the support shaft.

5 Claims, 3 Drawing Sheets

POWER TRANSMISSION APPARATUS WITH A COILED TORSIONAL SPRING CAPABLE OF BEING WOUND AROUND ROLLERS ON A SLEEVE ASSEMBLY FOR TRANSMITTING A TORQUE

BACKGROUND OF THE INVENTION

This invention relates to a power transmission apparatus for a machine, such as a plastic injection molding machine or a press machine, and more particularly to a power transmission apparatus, which includes a coiled torsional spring that serves as a clutch device and that can be wound around a plurality of rollers on a sleeve assembly during rotation of a primary driving gear for transmitting a torque from the primary driving gear to a driven gear.

SUMMARY OF THE INVENTION

The object of this invention is to provide a power transmission apparatus, which includes a coiled torsional spring that can be wound around a plurality of rollers on a sleeve assembly during rotation of a primary driving gear for transmitting a torque from the primary driving gear to a driven gear.

According to this invention, a power transmission apparatus includes a sleeve assembly disposed rotatably around a stationary support shaft and having an annular surface unit that is formed with a plurality of axially extending slots therethrough. A primary driving gear is sleeved fixedly on the sleeve assembly, and is adapted to be rotated by a power source. A secondary driving gear is sleeved rotatably on the sleeve assembly. A driven gear is sleeved rotatably on the support shaft. A plurality of rollers are confined respectively and rollably within the slots. A coiled torsional spring is disposed around the sleeve assembly, is spaced apart from the rollers, and is fastened to the secondary driving gear at one end and to the driven gear at the other end. During rotation of the primary driving gear, when the secondary driving gear rotates, the spring is wound around the sleeve assembly so as to clamp and lock the rollers between the spring and the sleeve assembly, thereby transmitting a torque from the primary driving gear to the driven gear. As such, the spring serves as a clutch device.

BRIEF DESCRIPTION OF THE DRAWINGS

These and other features and advantages of this invention will become apparent in the following detailed description of the preferred embodiment of this invention, with reference to the accompanying drawings, in which.

DETAILED DESCRIPTION OF THE PREFERRED EMBODIMENT

Figure 1:
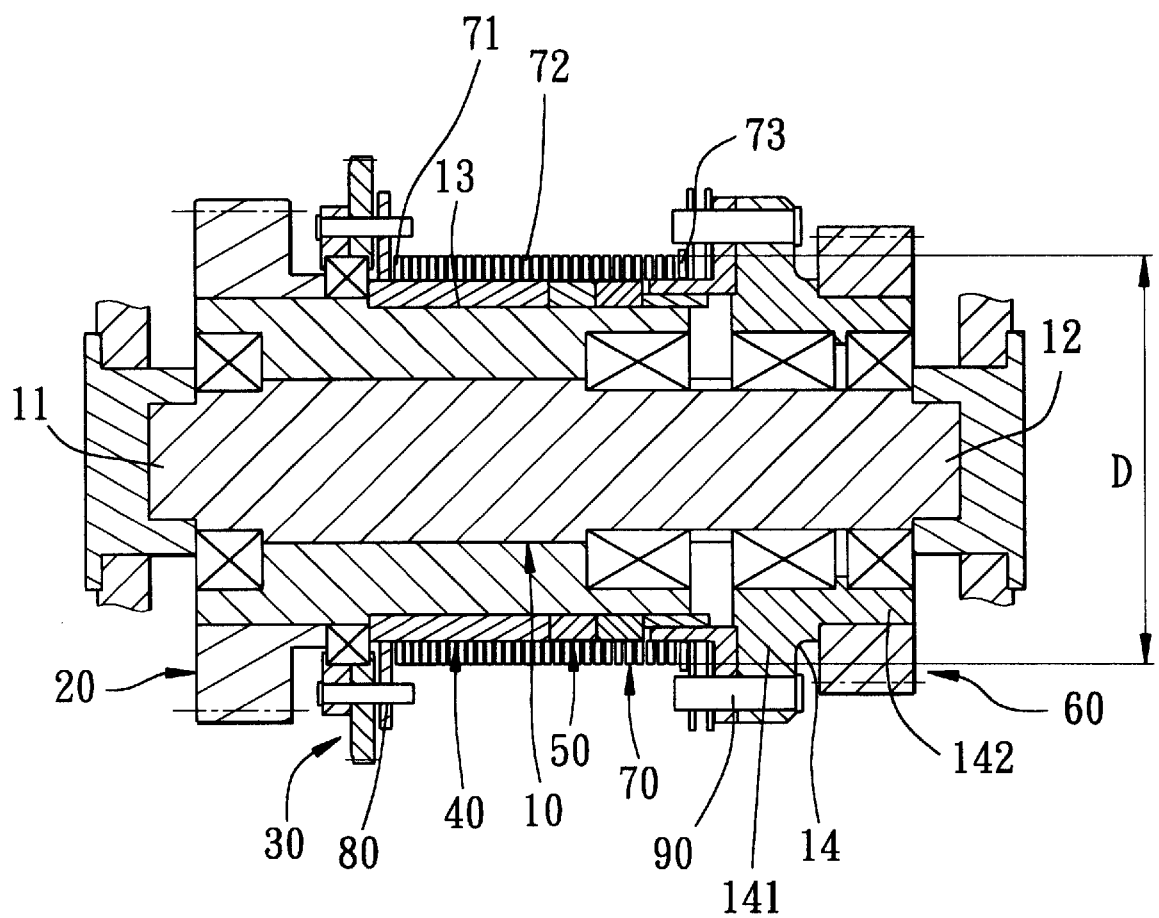
FIG. 1 is a longitudinal sectional view of the preferred embodiment of a power transmission apparatus according to this invention.
Figure 2:
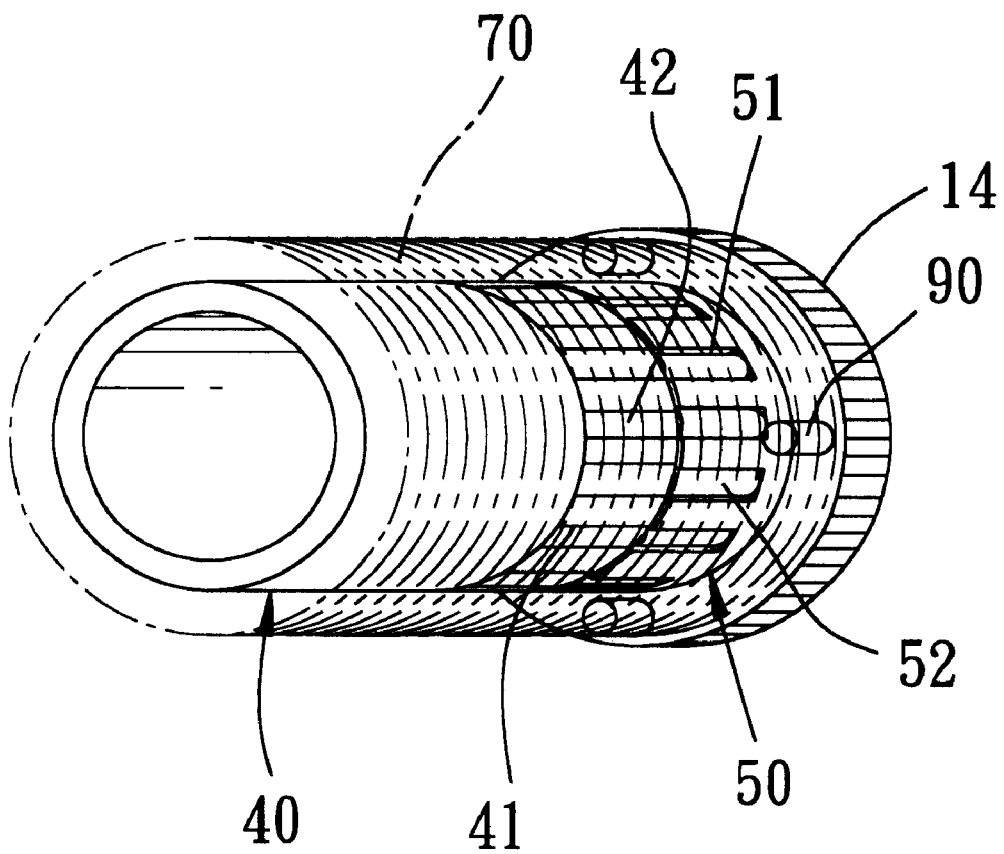
FIG. 2 is a perspective view showing a pair of front and rear outer sleeves, a plurality of front and rear rollers, and a coiled torsional spring of the preferred embodiment, which is shown by phantom lines for the sake of clarity.

Referring to FIGS. 1 and 2, the preferred embodiment of a power transmission apparatus according to this invention is shown to include a stationary support shaft 10, a primary driving gear 20, a secondary driving gear 30, a front outer sleeve 40, a rear outer sleeve 50, a driven gear 60, and a coiled torsional spring 70 that has a high rigidity. The power transmission apparatus is used in a machine that is equipped with a power source (not shown) and a servomotor (not shown).

The support shaft 10 has a front portion 11 and a rear portion 12. An inner sleeve 13 is disposed rotatably around the front portion 11 of the support shaft 10. A tubular mounting member 14 is disposed rotatably around the rear portion 12 of the support shaft 10, and has a thick front portion 141 and a thin rear portion 142 that is disposed behind and that is formed integrally with the thick front portion 141. The thin rear portion 142 has an outer diameter that is smaller than that of the thick front portion 141.

The primary driving gear 20 is configured as a spur gear, and is sleeved fixedly on the inner sleeve 13. The power source (not shown) can rotate the primary driving gear 20 in a predetermined direction.

The secondary driving gear 30 is also configured as a spur gear, and is sleeved rotatably on the inner sleeve 13. The servomotor (not shown) can rotate the secondary driving gear 30 in the predetermined direction.

The inner sleeve 13, and the front and rear outer sleeves 40, 50 constitute a sleeve assembly. The front and rear outer sleeves 40, 50 are disposed fixedly around the inner sleeve 13. The front outer sleeve 40 is disposed in front of the rear outer sleeve 50, and has a rear end that abuts against a front end of the rear outer sleeve 50.

Figure 3:
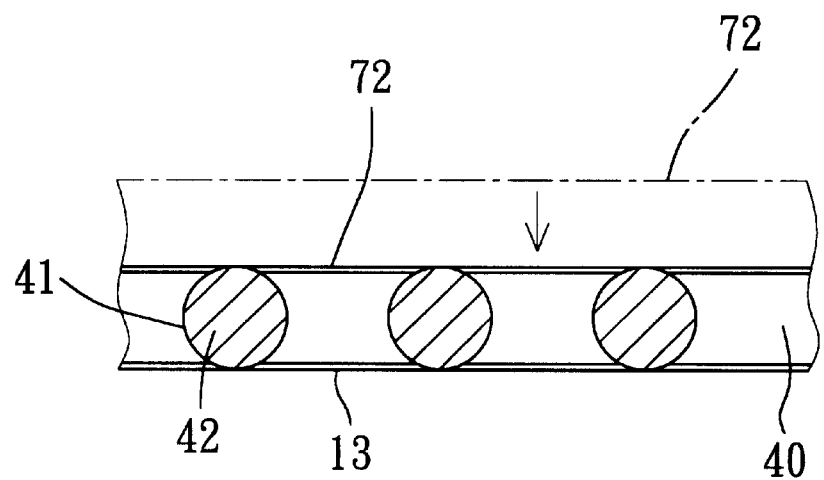
FIG. 3 is a stretched view of a front outer sleeve of the preferred embodiment, illustrating how the front rollers are clamped between the spring and an inner sleeve.
Figure 4:
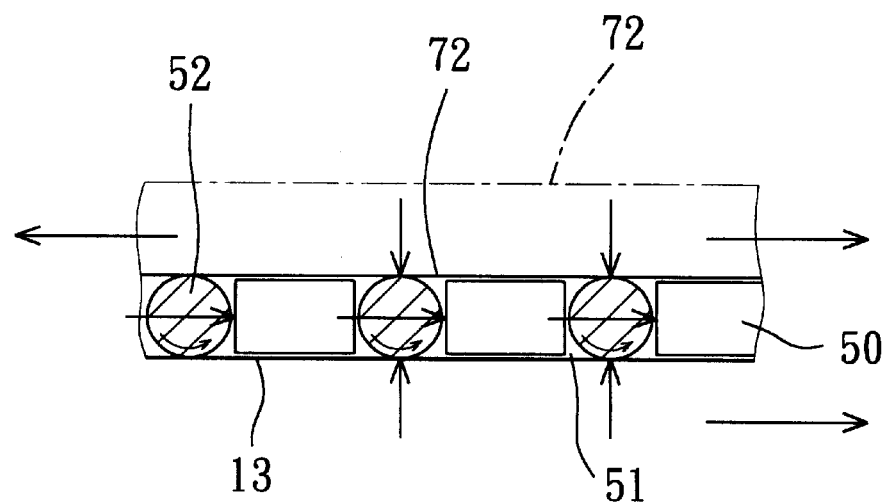
FIG. 4 is a stretched view of a rear outer sleeve of the preferred embodiment, illustrating how the rear rollers are clamped between the spring and the inner sleeve.

Referring to FIGS. 2, 3, and 4, each of the rear end of the front outer sleeve 40 and the front end of the rear outer sleeve 50 has an annular surface, which is formed with a plurality of angularly equidistant, open-ended slots 41, 51 that extend in an axial direction of the support shaft 10. The annular surfaces of the front and rear outer sleeves 40, 50 constitute an annular surface unit of the sleeve assembly. Each of the slots 41 has a closed front end, an open rear end, and a generally circular cross-section. A plurality of front rollers 42 are confined respectively and rollably within the slots 41. Each of the front rollers 42 has two side portions that project respectively and outwardly from two opposite sides of the corresponding slot 41. Each of the slots 51 has an open front end, a closed rear end, and a generally square-shaped cross-section. A plurality of rear rollers 52 are confined respectively and rollably within the slots 51. Each of the rear rollers 52 has two opposite side portions that project respectively and outwardly from two opposite sides of the corresponding slot 51.

Referring again to FIG. 1, the driven gear 60 is configured as a spur gear, and is sleeved fixedly on the thin rear portion 142 of the mounting member 14.

Referring to FIGS. 1, 2, 3, and 4, the spring 70 is disposed around the front and rear outer sleeves 40, 50, and has a front end 71 that is fastened to the secondary driving gear 30 by means of a front connecting unit 80, a coiled portion 72, and a rear end 73 that is fastened to the front portion 141 of the mounting member 14 by means of a rear connecting unit 90.

During rotation of the primary driving gear 20, when no power is applied on the secondary driving gear 30, the coiled portion 72 of the spring 70 is disposed at a disengagement position shown by phantom lines in FIGS. 3 and 4, where the coiled portion 72 is spaced apart from the front and rear rollers 42, 52 so that power transmission between the primary driving gear 20 and the driven gear 60 is interrupted.

During rotation of the primary driving gear 20, when a power is applied on the secondary driving gear 30 by the servomotor (not shown) so as to rotate the secondary driving gear 30, the coiled portion 72 of the spring 70 moves to an engagement position shown by solid lines in FIGS. 3 and 4, where the coiled portion 72 is wound around the front and rear outer sleeves 40, 50 so as to clamp the front and rear rollers 42, 52 between the coiled portion 72 and the inner sleeve 13. Hence, the outside diameter (D) (see FIG. 1) of the spring 70 is prevented from further variation such that the spring 70 is fixed relative to the primary driving gear 20 and the driven gear 60, thereby permitting transmitting of torque from the primary driving gear 20 to the driven gear 60 via the spring 70. As such, the spring 70 serves as a clutch device.

With this invention thus explained, it is apparent that numerous modifications and variations can be made without departing the scope and spirit of this invention. It is therefore intended that this invention be limited only as indicated by the appended claims.

I claim:

1. A power transmission apparatus comprising:

a stationary support shaft having a front portion and a rear portion;

a sleeve assembly disposed rotatably around said support shaft and having an annular surface unit, which is formed with a plurality of axially extending slots therethrough;

a primary driving gear sleeved fixedly on said sleeve assembly and rotatable in a predetermined direction;

a plurality of rollers confined respectively and rollably within said slots in said sleeve assembly, each of said rollers having two opposite side portions that project respectively and outwardly from two opposite sides of a respective one of said slots in said sleeve assembly;

a secondary driving gear sleeved rotatably on said sleeve assembly and rotatable in the predetermined direction;

a driven gear sleeved rotatably on said support shaft; and a coiled torsional spring disposed around said sleeve assembly and having a front end that is fastened to said secondary driving gear, and a rear end that is fastened to said driven gear, said spring being spaced apart from said rollers, said spring being wound around said rollers when said secondary driving gear rotates so that said rollers are clamped and locked between said spring and said sleeve assembly, thereby permitting synchronous rotation of said primary driving gear, said spring, and said driven gear.

2. The power transmission apparatus as claimed in claim 1, further comprising a tubular mounting member, which is sleeved rotatably on said rear portion of said support shaft and which has a thick front portion and a thin rear portion that is formed integrally with and that is disposed behind said thick front portion, said thick front portion being connected fixedly to said rear end of said spring, said thin rear portion having an outer diameter smaller than that of said thick front portion, said driven gear being sleeved fixedly on said thin rear portion of said mounting member.

3. The power transmission apparatus as claimed in claim 1, wherein said sleeve assembly includes:

an inner sleeve disposed rotatably around said support shaft, said primary driving gear being sleeved fixedly on said inner sleeve, said secondary driving gear being sleeved rotatably on said inner sleeve; and a pair of front and rear outer sleeves disposed fixedly around said inner sleeve, said front outer sleeve being disposed in front of said rear outer sleeve and having a rear end, said rear outer sleeve having a front end that abuts against said rear end of said front outer sleeve, each of said rear end of said front outer sleeve and said front end of said rear outer sleeve having an annular surface, said annular surfaces of said front and rear outer sleeves constituting said annular surface unit, said slots being formed in said annular surfaces of said front and rear outer sleeves and being located at said rear end of said front outer sleeve and said front end of said rear outer sleeve, each of said slots in said front outer sleeve having a closed front end and an open rear end, each of said slots in said rear outer sleeve having an open front end and a closed rear end.

4. The power transmission apparatus as claimed in claim 3, wherein said slots in said front outer sleeve have a generally circular cross-section.

5. The power transmission apparatus as claimed in claim 3, wherein said slots in said rear outer sleeve have a generally square-shaped cross-section.

* * * * *